United States Patent [19]
Reis et al.

[11] Patent Number: 5,585,078
[45] Date of Patent: Dec. 17, 1996

[54] PROCESS FOR REDUCING CARBON MONOXIDE AND CARBONYL SULFIDE EMISSIONS FROM A FLUIDIZED BED TITANIUM DIOXIDE CHLORINATOR

[75] Inventors: Paul G. Reis; Melvyn B. Pell; David N. Low; Hans H. Glaeser, all of Wilmington, Del.

[73] Assignee: E. I. Du Pont de Nemours and Company, Wilmington, Del.

[21] Appl. No.: 344,720

[22] Filed: Nov. 21, 1994

Related U.S. Application Data

[63] Continuation of Ser. No. 28,909, Mar. 8, 1993, abandoned.

[51] Int. Cl.$^6$ .................. C01G 23/00; C01G 23/047
[52] U.S. Cl. .................. 423/74; 423/614
[58] Field of Search .................. 423/74, 614

[56] References Cited

U.S. PATENT DOCUMENTS

| | | | |
|---|---|---|---|
| 2,446,181 | 8/1948 | Kraus | 423/493 |
| 2,701,179 | 2/1955 | McKinney | 423/492 |
| 2,790,703 | 4/1957 | Frey | 423/74 |
| 3,526,477 | 9/1970 | Wan | 423/613 |
| 3,591,333 | 7/1971 | Carlson et al. | 423/74 |
| 3,865,920 | 2/1975 | Dunn, Jr. | 423/74 |
| 3,870,506 | 3/1975 | Robinson et al. | 423/74 |
| 3,883,636 | 5/1975 | Cole et al. | 423/74 |
| 4,046,853 | 9/1977 | Robinson | 423/74 |
| 4,046,854 | 9/1977 | Dunderdale | 423/74 |
| 4,277,458 | 7/1981 | Sugier et al. | 423/539 |
| 4,389,391 | 6/1983 | Dunn, Jr. | 423/613 |
| 4,961,911 | 10/1990 | Reis et al. | 423/74 |

FOREIGN PATENT DOCUMENTS

| | | | |
|---|---|---|---|
| 693918 | 9/1964 | Canada | 423/74 |

*Primary Examiner*—Steven Bos

[57] ABSTRACT

In a process for chlorinating titanium containing material in a fluidized bed reactor which evolves gaseous material including CO, COS, and $TiCl_4$, the improvement comprising introducing oxygen containing gas at a location or locations which are downstream of the surface of the bed, as measured in its static condition, to convert at least some CO to $CO_2$ and some COS to $CO_2$ and $SO_2$.

15 Claims, No Drawings

PROCESS FOR REDUCING CARBON MONOXIDE AND CARBONYL SULFIDE EMISSIONS FROM A FLUIDIZED BED TITANIUM DIOXIDE CHLORINATOR

This a continuation, of application Ser. No. 08/028,909 filed Mar. 8, 1993, now abandoned.

BACKGROUND OF THE INVENTION

This invention relates to a process for reducing CO and COS emissions from a fluidized bed reactor for chlorinating titanium containing material.

In such process, chlorine, particulate coke, and particulate titanium bearing material are fed to a fluidized bed reactor under conditions that chlorinate the titanium and many of the other metallic impurities. Gaseous titanium tetrachloride, other metallic chlorides such as iron chloride, CO, COS, $CO_2$, and other gaseous products exit the fluidized bed reactor. The gaseous titanium tetrachloride produced can then be separated from the other metal chlorides and impurities and oxidized to titanium dioxide, which is useful as a white pigment, or further processed to produce titanium metal.

It would be desirable to reduce the amount of COS and CO emitted from the fluidized bed reactor because environmental requirements often restrict such materials to a low level. Emissions of COS and CO are often particularly a problem when the reactor is operated in the ferrous mode, i.e., at least 50 percent by volume of the iron chloride evolved from the fluidized bed reactor is ferrous chloride.

The following information is disclosed which may be of interest to this invention:

Reis, U.S. Pat. No. 4,961,911 discloses a process for reducing CO emissions from a fluidized bed reactor for chlorinating titanium containing material. The process consists of introducing chlorine above the surface of the fluidized bed while it is operated in the ferrous mode.

U.S. Pat. Nos. 2,790,703 and 3,526,477 disclose processes for chlorinating titanium containing material in a fluidized bed reactor. It is stated that titanium tetrachloride can be used to cool the reaction products from the fluidized bed.

U.S. Pat. Nos 3,883,636 and 3,591,333 also disclose processes for chlorinating titanium containing material in a fluidized bed reactor. The efficiency of chlorination is said to be improved by conducting it in the presence of compounds of chromium, lanthanum, vanadium, magnesium, calcium, strontium, barium, cadmium, and mixtures thereof.

SUMMARY OF THE INVENTION

In accordance with the present invention, there is provided:

In a process for chlorinating titanium containing material in a fluidized bed reactor which evolves gaseous material including CO, COS, and $TiCl_4$, the improvement comprising introducing oxygen containing gas at a location or locations which are downstream of the surface of the bed, as measured in its static condition, to convert at least some CO to $CO_2$ and some COS to $CO_2$ and $SO_2$.

It has been found that the process of this invention can substantially reduce the emissions of CO and/or COS and is especially useful when the fluidized bed chlorinator is operated in the ferrous mode. Other advantages of this invention include:

COS and CO emissions can be minimized without substantially oxidizing $TiCl_4$ to $TiO_2$.

$CO_2$ and $SO_2$ are believed to be the major reaction products of oxidizing COS and CO in the process of this invention. Release of $CO_2$ generally is not an environmental problem, and $SO_2$ can readily be scrubbed from reaction gases by known means.

Oxygen containing gas, which is evolved from a process to oxidize $TiCl_4$ to $TiO_2$, can be used in the process of this invention. It has been found that such gas can both minimize CO and COS emissions and be used to control or limit the amount of $TiCl_4$ production so that it matches the capacity of the process to oxidize $TiCl_4$ to $TiO_2$.

DETAILED DESCRIPTION OF THE INVENTION

The process for chlorinating titanium containing material in a fluidized bed reactor is known. Suitable processes are disclosed in the following U.S. Pat. Nos. 2,701,179, 3,883,636, 3591,333, and 2,446,181, which are hereby incorporated by reference.

In such process, particulate carbonaceous material, particulate titanium-bearing material, and chlorine are fed to a suitable reactor, and a suitable reaction temperature, pressure, and flow rates are maintained to sustain the fluidized bed. Gaseous titanium tetrachloride and other metal chlorides are discharged from the reactor chamber. The gaseous titanium tetrachloride so produced can be separated from the other metal chlorides and used to produce titanium dioxide pigment or titanium metal.

Often, the fluidized bed will have conditions and specifications as follows: reaction temperature of about 700°–1400° C., pressure of about 1.5–3 atmospheres, reactor size of about 6–25 feet in diameter with multiple chlorine jets in or near the base, reactor superficial velocity of about 0.5–1.5 feet per second, and a static bed depth of about 6–25 feet. Typically, the titanium-containing material initially fed has a mean particle size of about 100–3000 microns in diameter. Preferably, the chlorine jets will be located below the surface of the bed, as measured in its static condition, and within about 0–10, and most preferably about 0–5 feet of the base of the reactor. A most preferred location for the jets is the base of the reactor.

Preferably, the carbonaceous material is coke. Especially preferred is coke or calcined coke that is derived from petroleum or coal or mixtures of such cokes.

The titanium containing material can be any suitable titanium source material such as titanium containing ores including rutile, ilmenite or anatase ore; beneficiates thereof; titanium containing by-products or slags; and mixtures thereof.

Iron or iron in the form of compounds or complexes (hereinafter collectively referred to as "iron material") is often present in titanium containing materials that are chlorinated in fluidized bed reactors. Often such iron material will be present in an amount of about 0.5–50 percent by weight. A major amount of the iron material typically is present as iron oxide.

In such fluidized bed reactors, the iron material in the titanium containing material typically reacts to form iron chloride, which can be present in the form of ferrous chloride or ferric chloride. While the process of this invention can operate when ferric chloride ("ferric mode"), ferrous chloride ("ferrous mode") or both are produced, often COS and CO emissions are more abundant when operating in the ferrous mode. Thus, a preferred embodiment of this invention is when the fluidized bed reactor for chlorinating titanium bearing materials is operated in the ferrous mode. By this is meant that at least 50 percent by volume of the gaseous iron chloride exhausted from the fluidized bed reactor will be in the form of ferrous chloride. It often is desirable to operate in the ferrous mode, rather than the ferric mode, so that lesser amounts of costly chlorine are consumed. Means for favoring the reaction to the ferrous state are known, and most importantly involve not adding chlorine in substantial excess of that required to obtain the ferrous state.

The oxygen containing gas should be introduced at a location or locations which are downstream of the surface of the bed, as measured in its static condition. A preferred embodiment of this invention is to introduce the oxygen containing gas within the reactor. The oxygen containing gases can also be introduced into the flue or flues exiting the reactor. An especially preferred embodiment is to introduce the oxygen containing gas within the reactor and about 0–5 feet downstream of the surface of the active fluidized bed. Often, the oxygen containing gas will be introduced up to about 25 feet, preferably up to about 15 feet, and most preferably up to about 10 feet downstream of the surface of the bed as measured in the static condition.

To optimize mixing in the reactor and minimize erosion problems that might be caused by high volumes and high velocities of oxygen containing gas being injected, preferably the oxygen containing gas (1) will be injected from a plurality of inlets, and (2) will be injected at a suitable velocity.

The amount of oxygen containing gas added should be sufficient to cause the desired amount of COS and CO to convert to $CO_2$ and $SO_2$. Typically, the amount of oxygen containing gas used will be about the stoichiometric amount to convert the desired amount of COS and CO to $CO_2$ and $SO_2$. In practice, the amount of oxygen containing gas used often will be about 0.1–20, preferably about 1–15, and most preferably about 2–8 pounds of oxygen containing gas per hour per square foot of the inside cross-sectional area of the reactor, as measured at the largest inside diameter of the reactor. Also, preferably, the oxygen containing gas will be added until there is no longer any additional reduction in the amount of COS and CO exiting the fluidized bed reactor. This can be done by analyzing the gases exiting the fluidized bed reactor for the presence of COS and CO. In addition, or in the alternative, the gases exiting the fluidized bed reactor can be analyzed for increased levels of $CO_2$ and $SO_2$, which are believed to be the primary reaction products of COS and CO with the oxygen containing gas.

Air or oxygen are suitable oxygen containing gases. Other suitable oxygen containing gases are those which include, naturally or by addition, suitable amounts of air or oxygen; examples hereof include gas evolved from a process to oxidize $TiCl_4$ to $TiO_2$, nitrogen, and combustion gas. Mixtures of oxygen containing gas can be used. Typically, the oxygen containing gas will contain about 0.1–25 percent and preferably about 1–12 percent by volume oxygen. A typical analysis for gas exiting a process to oxidize $TiCl_4$ to $TiO_2$ is about 0.1–25 percent by volume oxygen, at least 50 percent by volume chlorine (typically 50–95 percent by volume chlorine), 20–40 percent by volume nitrogen, and about 0.1–15 percent other gases, e.g. CO, COS, $CO_2$, $H_2O$, and HCl.

Another advantage of the process of this invention is that it can be used both to reduce COS and CO emissions, and to control $TiCl_4$ production. For example, if the oxygen containing gas contains chlorine (e.g., it is the gas exiting a process for oxidizing $TiCl_4$ to $TiO_2$), then the amount of such gas and/or its chlorine content can be adjusted to regulate $TiCl_4$ production. Regulating $TiCl_4$ production can be important so that it can be matched to the available capacity to oxidize it to $TiO_2$.

The process of this invention can generally be used over the gas temperatures at which fluidized bed reactors are used to chlorinate titanium containing material, and over the range of temperatures of the hot gases in the exit flues from the reactor. Generally, this temperature will be about 700°–1400° C., preferably about 800°–1150° C., and more preferably about 850°–1000° C. It should be noted that this temperature is measured above the surface of the active fluidized bed.

The following example illustrates the operation of the process of this invention.

EXAMPLE

A vertical, cylindrical, fluidized bed reactor operating at about 950° C. and operating in the ferrous mode was fed (a) with an ore blend containing about 74 percent $TiO_2$ and about 21.6 percent iron oxides, and (b) calcined petroleum coke. Gas consisting of about 70 percent by volume chlorine, 6 percent by volume oxygen, and other gases, primarily nitrogen and hydrogen chloride, was fed through multiple jets at the base of the reactor. The gas fluidized the reactor and was evolved from a process to oxidize $TiCl_4$ to $TiO_2$. Reaction products rose vertically and were discharged near the top of the reactor. Liquid $TiCl_4$ was fed above the surface of the bed (as measured in its static condition) to control the temperature of the bed.

Virgin chlorine was fed at a location which was about 9–12 feet above and downstream of the surface of the bed, as measured in its static condition. The chlorine was fed at a rate of about 2.4 pounds/hour/square foot of inside cross-sectional area of the reactor, as measured at the largest inside diameter of the reactor. After the gases exiting the reactor were cooled to condense $TiCl_4$ and other metal chlorides, they contained 2.64 volume percent CO and 0.080 volume percent COS.

Then, the virgin chlorine fed above the bed was replaced with the fluidizing gas described in the first paragraph of this example. Such gas was fed at the same location above the bed and at a rate which introduced chlorine into the reactor in approximately the same amount as that of the virgin chlorine initially fed above the bed. To the extent such gas was fed above the bed, it was not fed below the bed. The gases leaving the chlorinator contained 1.67 volume percent CO and 0.006 volume percent COS. Thus, by switching to this oxygen containing gas, the CO emitted from the fluidized bed chlorinator was reduced by 36.7 percent, and the COS was reduced by 92.5 percent.

The invention claimed is:

1. In a process for producing $TiO_2$ comprising chlorinating titanium containing material in a fluidized bed reactor which evolves gaseous material including CO, COS, $TiCl_4$, and iron chloride wherein at least 50 percent by volume of the iron chloride is ferrous chloride, and other metal chlorides, which are withdrawn through one or more flues; subsequently separating the $TiCl_4$ from the metal chlorides; and then oxidizing the separated $TiCl_4$ to form $TiO_2$, the improvement comprising introducing oxygen containing gas into at least one location which is downstream of the surface of the fluidized bed, as measured in its static condition, said oxygen containing gas being introduced in an amount to convert at least some of the COS and CO to CO2 and $SO_2$ which reduces CO and COS emissions.

2. The process of claim 1 wherein the improvement further comprises introducing oxygen containing gas within the reactor.

3. The process of claim 1 wherein the improvement further comprises introducing the oxygen containing gas into the flue or flues exiting the reactor.

4. The process of claim 1 wherein the amount of oxygen containing gas is about the stoichiometric amount required to convert of COS and CO to $CO_2$ and $SO_2$.

5. The process of claim 1 wherein the improvement further comprises a temperature in the flue or flues of about 700°–1400° C.

6. The process of claim 1 wherein the improvement further comprises an oxygen containing gas that exits from a process to oxidize $TiCl_4$ to TiO2, containing chlorine in the amount of at least about 50 percent by volume, and containing oxygen in the amount of about 0.1–25 percent by volume.

7. The process of claim 1 wherein the oxygen containing gas is introduced within the reactor at a rate of about 0.1–20 pounds of oxygen containing gas per hour per square foot of the inside cross-sectional area of the reactor.

8. The process of claim 1 wherein the improvement further comprises oxygen containing gas that is (a) air, chlorine, nitrogen or mixtures thereof having oxygen present therein in an amount of 0.1–25 percent by volume, (b) oxygen or (c) mixtures thereof.

9. The process of claim 1 wherein the improvement further comprises introducing the oxygen containing gas at a location or locations which are up to 25 feet downstream from the surface of the bed, as measured in its static condition.

10. The process of claim 1 wherein the improvement further comprises introducing the oxygen containing gas at a location or locations which are up to about 15 feet downstream of the surface of the bed, as measured in its static condition.

11. The process of any one 1–10 wherein the improvement further comprises an oxygen containing gas that exits a process to oxidize $TiCl_4$ to $TiO_2$ containing chlorine in the amount of at least about 50 percent by volume and containing oxygen in the amount of about 0.1–25 percent by volume.

12. The process of any one of claims 1–4 or 6–10 wherein the improvement further comprises maintaining the temperature of the gas above the surface of the active fluidized bed at about 800°–1150° C. by introducing liquid $TiCl_4$ above the surface of the fluidized bed, as measured in its static condition.

13. The process of claim 1 wherein the improvement further comprises:

(a) an oxygen containing gas that is evolved from a process to oxidize $TiCl_4$ to $TiO_2$, containing chlorine in the amount of at least about 50 percent by volume, and containing oxygen in the amount of about 0.1–25 percent by volume, (b) the oxygen containing gas is introduced within the reactor through a plurality of inlets at a rate of about 2–20 pounds per hour per square foot of inside diameter of the reactor, and (c) the temperature of the gas above the fluidized bed is maintained at about 850°–1000° C.

14. The process of claim 13 wherein (a) gaseous iron chloride is also evolved from the fluidized bed reactor and at least 50 percent by volume of such iron chloride is in the form of ferrous chloride, and (b) the oxygen containing gas is introduced at a location or locations which are up to about 15 feet downstream of the surface of the bed as measured in its static condition.

15. The process of claim 6 wherein the amount of oxygen containing gas used, and/or its chlorine content, is adjusted to control the amount of $TiCl_4$ production.

\* \* \* \* \*